UNITED STATES PATENT OFFICE.

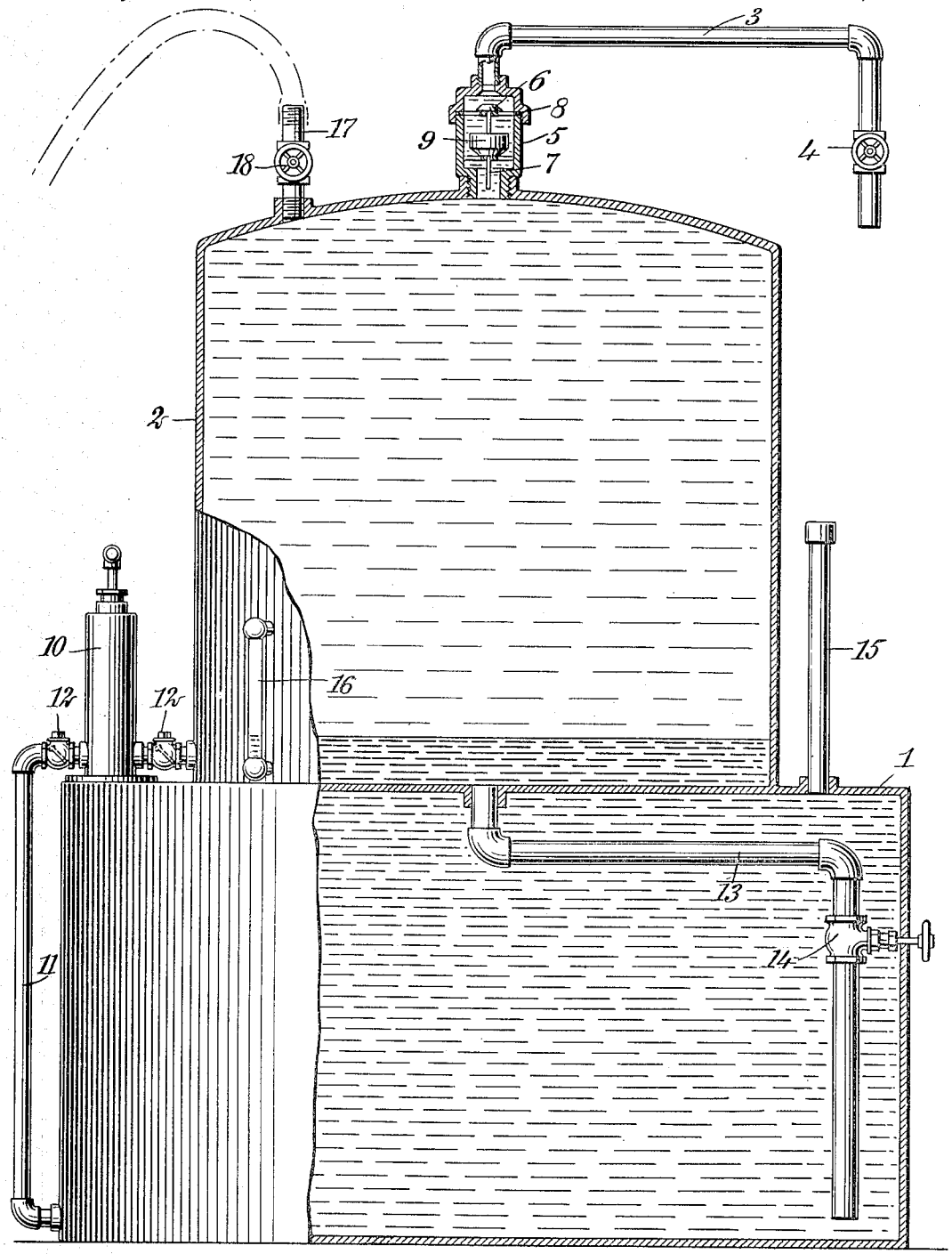

JOSEPH B. EVANS, OF SELMA, ALABAMA.

APPARATUS FOR STORING AND DISPENSING HYDROCARBON LIQUIDS.

No. 916,131.　　　　Specification of Letters Patent.　　Patented March 23, 1909.

Application filed October 2, 1907. Serial No. 395,498.

*To all whom it may concern:*

Be it known that I, JOSEPH B. EVANS, a citizen of the United States, and a resident of Selma, in the county of Dallas and State of Alabama, have invented a new and Improved Apparatus for Storing and Dispensing Hydrocarbon Liquids, of which the following is a full, clear, and exact description.

This invention is an improved apparatus for storing and dispensing hydrocarbon and such volatile liquids as gasolene.

The invention embodies in its construction a tank which is at all times kept in a filled condition, whereby evaporation of the liquid is substantially prevented and the danger of explosion practically eliminated.

The apparatus is constructed for the use of retailers, garages, etc., more especially where a water pressure supply is not obtainable or may not be conveniently had.

Reference is to be had to the accompanying drawing forming a part of this specification and wherein is represented the preferred embodiment of my improved apparatus partly in central vertical section.

The apparatus essentially consists of two tanks 1 and 2 with means for forcing the liquid contained in the tank 1, into the tank 2, and dscharging it back thereinto, together with means for discharging the hydrocarbon liquid from the tank 2 as it is displaced by the other liquid. The tank 1 should be of slightly greater capacity than the tank 2 in order that the contents thereof when in a filled condition will be more than sufficient to expel the hydrocarbon liquid in the tank 2. The tank 2 is preferably mounted upon and rigid with the tank 1, and is provided with a suitable discharge pipe 3 having a controlling-valve 4 and connected with the tank through the intermediary of a valve-casing 5, the latter containing a valve comprising a valve-head 6 attached to the upper end of a stem 7 which is slidable in and maintained in a substantially vertical position by suitable guides 8, as shown.　One of these guides 8, it will be observed, is in the nature of a spider which is clamped in place between the screw-threaded sections of the casing 5.

Between the guides of the valve-stem 7 there is attached thereto a float 9 of such specific gravity as to sink with the valve in gasolene or other like liquid but buoyantly rise with and seat the valve in such liquids of higher specific gravity, as water. The means employed for forcing the liquid of higher specific gravity, such as water, from the tank 1 into the tank 2 is preferably a manually-operated force pump 10 which is conveniently situated on top of the tank 1 and connects with the lower portion thereof through a pipe 11 and discharges into the lower portion of the tank 2, the usual check valves 12 being provided at the opposite sides of the pump for causing the flow of the water in this direction.

The bottom of the tank 2 is provided with a discharge in the nature of a pipe 13 leading to a point near the bottom of the tank 1 and having a controlling-valve 14 which is accessible at the outside of the tank. The tank 1 is further provided with a vent pipe 15 vertically rising from its top. The lower portion of the tank 2 is provided at the exterior with a gage 16 in the form of the usual transparent tube, and the top of the tank carries a filling plug or pipe 17 having a controlling-valve 18, the said pipe being threaded at its outer end for receiving a hose coupling of the hose employed in refilling the tank.

Assuming the tank 1 to be filled with water and also the lower portion of the tank 2 to the point indicated, which may be observed through the gage 16, and the upper portion of the tank 2 filled with a hydrocarbon liquid, such as gasolene, when it is desired to draw a quantity of gasolene, a measure or other receptacle is placed under the depending end of the discharge pipe 3 and the valve 4 opened. By now operating the pump 10, the water from the bottom tank 1 will be forced into the tank 2, causing such quantity of the gasolene as desired to be dispelled, thus keeping the tank 2 in a filled condition. When substantially all of the gasolene has been drawn from the tank 2 and the water level has passed to the float 9, the valve will be forcibly seated, thereby preventing the water from passing through the discharge pipe. To again refill the tank 2 with the hydrocarbon liquid, the valve 4 is closed and a hose leading from the barrel in which the said liquid is contained is applied to the pipe 17. On now opening the valves 18 and 14 the water flows back to the tank 1 and the suction caused thereby draws the gasolene into the tank 2. When the water has again sunk to its original level, the valves 14 and 18 are closed and the apparatus is again in readiness for dispensing purposes. It will be necessary at times to add to the water in order to maintain its level slightly above the top of the tank 1, whereby it may not be possible for the gasolene to pass into this tank; this being accomplished by introducing the water through the vent pipe 17.

The invention as shown and described while being my preferred practical embodiment of the same is nevertheless susceptible to modifications within the scope of the appended claims.

Having thus described my invention, I claim as new and desire to secure by Letters Patent:

1. The combination of a tank adapted to contain water, a second tank superposed thereon adapted to contain a hydrocarbon liquid, a manually-operated pump connected with the lower portion of the first-named tank and discharging into said second tank, a valve-casing connecting with the upper portion of the second tank, a discharge pipe leading from the valve-casing, a float-controlled valve contained within said casing for automatically cutting off the discharge through said pipe when the water level has passed thereto, and a pipe leading from the bottom of the second tank to a point closely adjacent to the bottom of the first tank for returning the water thereto.

2. The combination of a tank adapted to contain water, a second tank superposed thereon adapted to contain a hydrocarbon liquid, a manually-operated pump connected with the lower portion of the first-named tank and discharging into said second tank, a valve-casing connecting with the upper portion of the second tank, a discharge pipe leading from the valve casing, a float-controlled valve contained within said casing for automatically cutting off the discharge through said pipe when the water level has passed thereto, a pipe leading from the bottom of the second tank to a point closely adjacent to the bottom of the first tank for returning the water thereto, a vent provided at the top of the first-named tank, and a water gage connected with the second tank at the lower portion thereof.

3. The combination of two tanks arranged at different elevations, the higher tank adapted to contain a hydrocarbon liquid and the lower tank adapted to contain a liquid of higher specific gravity, a discharge leading from the upper portion of the upper tank, a pump for passing the liquid of higher specific gravity from the lower portion of the lower tank to the lower portion of the upper tank, and means for returning the liquid of higher specific gravity from the upper tank to the lower tank, by gravity.

4. The combination of two tanks arranged at different elevations, the higher tank adapted to contain a liquid of one specific gravity, and the lower tank adapted to contain a liquid of a higher specific gravity, a discharge leading from the upper portion of the upper tank, means for forcibly introducing the liquid of higher specific gravity from the lower tank into the upper tank, and means for returning the liquid of higher specific gravity from the upper tank to the lower tank by gravity.

In testimony whereof I have signed my name to this specification in the presence of two subscribing witnesses.

JOSEPH B. EVANS.

Witnesses:
  W. W. HOLT,
  EVERARD B. MARSHALL.